Oct. 18, 1966 L. W. NELSON 3,279,699
HUMIDITY CONTROL ADJUSTED BY LOAD
Filed Jan. 20, 1964

INVENTOR.
LORNE W. NELSON
BY Clyde C. Blinn
ATTORNEY 3,279,699
HUMIDITY CONTROL ADJUSTED BY LOAD
Lorne W. Nelson, Bloomington, Minn., assignor to
Honeywell Inc., a corporation of Delaware
Filed Jan. 20, 1964, Ser. No. 338,782
13 Claims. (Cl. 236—44)

The present invention is concerned with an improved humidity control system; in particular, the system is concerned with the control of the humidity in a space to prevent the condensation of moisture on the windows of the space when the outdoor temperature is low. Specifically, the means for adding moisture to the air in the space is controlled by a humidity responsive device to maintain a predetermined humidity, and the control point of the humidity responsive device is reset by a device responsive to the heating load of the space or the output of the heat supplying means.

While the control of condensation of moisture on windows of a space is not new, many of the control systems are quite elaborate requiring special equipment and involving a costly installation. If the outdoor temperature drops so the temperature of the windows of a space are below the dew point temperature of the air in the space, condensation on the windows will result. At the same time, condensation of moisture in the walls and in the ceiling can take place, and the amount of moisture condensing in the other places has been found to be quite proportional to the condensation of moisture on the windows. While the condensation of moisture on the windows is quite objectionable in the winter time as the windows become non-transparent, the condensation of moisture in the walls and the ceiling area of a dwelling can result in damage to the wood or construction material of the dwelling if the condition is allowed to exist for extended periods of time.

Various means have been heretofore used for controlling the humidity to prevent such condensation. Humidity and frost sensors on the windows have been used to prevent the addition of moisture to the air in the space. In the devices heretofore used, special controls have been made up and the installation of such controls has been quite complicated.

In the present invention, the control of the humidity in a space is accomplished in a normal manner by humidity control to respond to the humidity in the air of the space. Since the operation of the furnace or heating device is a function of the heating load on the space, the control point of the humidity responsive device is adjusted by a signal indicative of the heating load. In this manner, as the furnace operates more and more to increase the air temperature supplied to the space, which is indicative of an increase in the heating load or a decrease in the outdoor temperature, the signal indicative of the increased heating load or specifically the furnace operation or temperature is reused to reset the control point of the humidity control.

With such a control device, the humidity control can be installed in the return air duct of a forced air system and a very convenient installation can be obtained by a plenum temperature responsive device to respond to the plenum temperature to reset the control point of the humidity control. As the plenum and return air duct are relatively close together, the control involves very little installation expense and good results are obtained.

An object of the present invention is to provide an improved humidity control system for maintaining the humidity in a space below a predetermined level depending upon the outdoor temperature to prevent moisture condensation.

Another object of the present invention is to provide a humidity control system wherein the moisture level in a space is controlled to maintain a predetermined humidity and as the output of the heating device increases causing a change in a load indicative environment established in the immediate vicinity of the heating device, the humidity control is reset to maintain a different humidity in the space.

Another object of the present invention is to provide an improved humidity control device for responding to the humidity of a space and varying the control point of the humidity control by a furnace temperature responsive device.

These and other objects of the invention will become apparent upon the study of the following specification and drawing of which:

Figure 1:
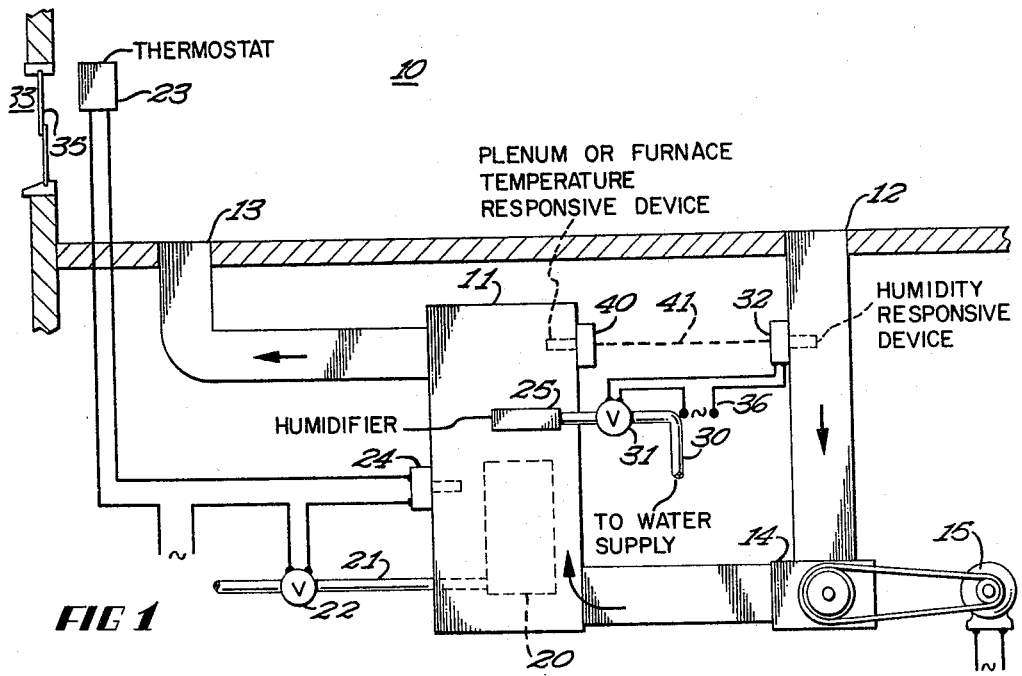
FIGURE 1 is a schematic representation of a typical installation showing the furnace supplying heated air to a space and the humidifier being controlled by a humidity responsive device which has a control point reset by the plenum temperature.

Referring to FIGURE 1, space 10 receives air which is conditioned for temperature and moisture level in a conventional manner by circulating the air through a furnace 11 by way of a return duct 12 and back to the space by means of a supply duct 13. The air movement is accomplished by means of a conventional fan 14 driven by a constantly energized motor 15. The air passing through furnace 11 is heated by a conventional heat exchanger 20 having a burner which receives fuel or gas through the pipe 21 when a valve 22 is opened. Valve 22 is controlled by a space thermostat 23 which is connected in a circuit in series with a plenum or bonnet high temperature limit controller 24. When thermostat 23 calls for the need of heat in space 10, valve 22 is opened to increase the temperature of the furnace and the temperature of the air supplied to the space from supply duct 13.

Contained in furnace 11 is a humidifier or moisture supplying device 25 of a conventional type which provides for the evaporation of water into the air passing through the furnace 11 to be delivered to space 10. Humidifier 25 receives water from a supply 30 when a valve 31 is opened. The control of the water supply valve 31 is accomplished by a humidity responsive device 32 which responds to the moisture level of the air in space 10. Device 32 connects valve 31 to a source of power 36. Humidity responsive device 32 is shown positioned in the return air duct 12 to respond to the moisture level of the return air; however, such a humidity responsive device might be mounted in other positions and even in space 10 as long as the device provides an output signal for controlling valve 31 in response to the humidity level of the air of space 10.

As the temperature outdoors 33 decreases, the heating load on furnace 11 increases. At the same time, a decrease in the outdoor temperature results in a decrease in the temperature of the window 35. When the temperature of the window drops below the dew point temperature of the air in space 10, condensation of moisture takes place on the glass of window.

A temperature responsive device 40 responds to the temperature of the plenum or the output of the furnace. Temperature responsive device 40 which is of sufficient thermal mass as to give an average temperature of the output of the furnace as the furnace is cycled on-off by thermostat 23 is connected by connection 41 to humidity responsive device 32 whereby upon an increase in the average plenum temperature which is indicative of the heating load of the system, the control point of the humidity responsive device 32 is decreased to lower the humidity level maintained in space 10. In a majority of the cases, an increase in the plenum temperature is indicative of a decrease in the outdoor temperature; therefore, the output of the plenum temperature responsive device 40 is capable of resetting the control point of humidity responsive device 32 to decrease the level of humidity maintained in space 10 and thus prevent the condensation of moisture on the glass of window 35.

Such a system provides a very convenient and inexpensive control system for resetting the moisture level in a space as a function of the heating load of the space. Since the return air duct 12 is closely associated with the furnace, the humidity controller 32 can be mounted in the return air duct and the means for resetting the humidity by a signal indicative of the heating load can be provided by a closely associated plenum temperature responsive device 40 and the connection 41 is relatively short and easy to make.

Figure 2:
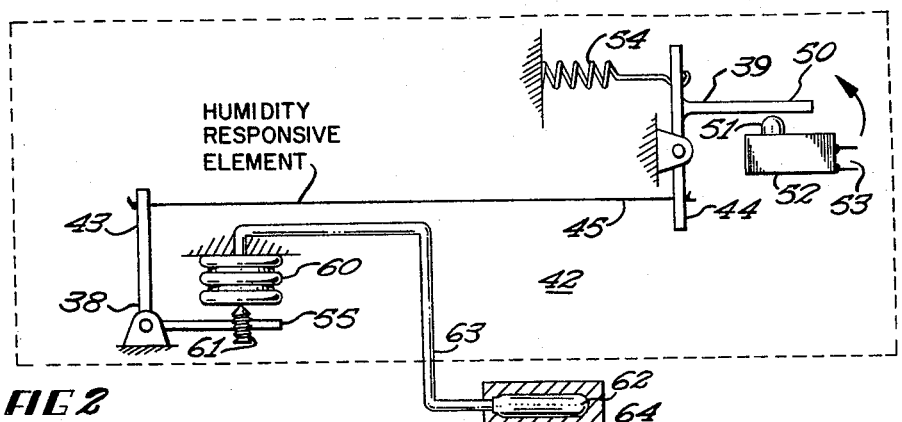
FIGURE 2 is a specific control device for use in the system of FIGURE 1 wherein a humidity responsive element is used to control the operation of a switch and the control point of the humidity responsive device can be adjusted with an expandable member which has a remotely associated bulb adapted to be responsive to the plenum temperature.

Referring to FIGURE 2, a specific embodiment of a control device for use in the system as described in FIGURE 1 is shown. A lever 38 and a lever 39 are pivotally attached to a base 42. Mounted between one leg 43 of lever 38 and one leg 44 of lever 39, is a moisture responsive element 45 made up of a nylon, human hair or other suitable humidity sensing material which changes in length upon a change in the moisture level of the air surrounding the element. Another arm 50 of lever 39 engages an operating button 51 of a conventional snap switch 52 as shown in the McGall Patent 1,960,020. An output circuit 53 of switch 52 would be connected in a conventional manner to control the voltage supply to valve such as 31 in FIGURE 1. A bias spring 54 is connected to lever 39 to bias the lever in a counterclockwise direction and since the other leg 55 of lever 38 is biased against an adjustable stop, spring 54 maintains element 45 under tension. A bellows or expandable chamber 60 is mounted between base 42 and leg 55 to receive a calibration screw 61 for adjusting the calibration of the control device. Bellows 60 is connected to a remote bulb 62 by a capillary tube 63 to form a liquid filled system so that upon the increase in temperature of bulb 62, bellows 60 increases to move lever 40 clockwise and change the control point of the humidity responsive device. An insulation and thermal mass heat sink 64 is provided on bulb 62 so that when the bulb 62 is placed in the plenum of the furnace, the bulb responds to the average plenum temperature and is not affected by sudden changes in temperature.

Figure 3:
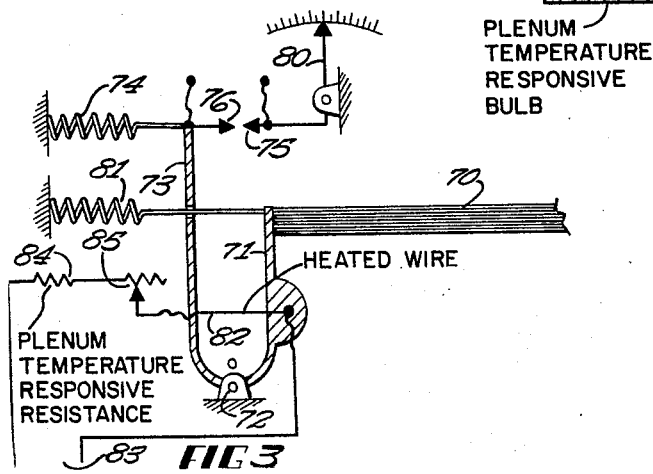
FIGURE 3 is a second embodiment of the present control device showing a bracket for supporting a humidity responsive element to control a switch and a means for adjusting the movement of the bracket indicative of the plenum temperature of the heating device.

In FIGURE 3 another embodiment of the specific control device is shown having a moisture responsive element 70 which is mounted between a fixed base (not shown) and lever 71 of a U-shaped bracket which is pivotally mounted on a pivot point 72 at a closed end of the U. The other leg 73 of the U-shaped bracket is connected to a bias spring 74 to pull the bracket counterclockwise about pivot 72 to position contact 76. When contact 76 engages contact 75 an electrical circuit is closed which can be adapted to control the water supply control valve of a system similar to FIGURE 1. The adjustment of a control point of the switch formed by contacts 75 and 76 can be adjusted by member 80 to maintain various levels of humidity.

A spring 81 is connected between the end of lever 71 and the base to maintain a bias of the moisture responsive element 70. A heated wire 82 is connected between legs 71 and 73 of the U-shaped bracket. The wire changes in length as the temperature of the wire changes so that a repositioning of the leg 73 with respect to leg 71 can be obtained to change the control point or the effect of element 70 on the switch 75–76. Wire 82 is connected into an electrical circuit which can be traced from a source of power 83 through a temperature responsive resistor 84 and an adjustable resistance 85, heated wire 82 and back to the other side of the source of power. Temperature responsive resistance 84 is adapted to respond to the average temperature of the air in a furnace plenum so that upon various air temperatures, the amount of current circulating through the heated wire 82 is changed to adjusted the control point of the moisure responsive device in response to the average plenum air temperature or furnace load.

While the plenum temperature is shown for resetting the control point of the moisture responsive device, a signal indicative of the amount of operation of the furnace could be used to reset the control point of the humidity control.

In the operation of the present invention, the humidity of the air in space 10 as shown in FIGURE 1 is controlled by a moisture responsive device responding to the moisture of the air whether the device is mounted in the return air duct or is located in the space 10. Such a moisture responsive device is shown in the two embodiments of FIGURES 2 and 3.

As the heating load on the space increases by a change in various conditions such as the outdoor air temperature, the furnace fuel valve 22 delivers more fuel to the furnace and the furnace plenum temperature would increase. Since the plenum temperature provides a signal indicative of the heating load of the furnace, the average plenum temperature as sensed by the temperature responsive device 40 is connected to reset the control point of the humidity responsive device 32 to cut down the level of the humidity in space 10 as the outdoor temperature drops. By decreasing the humidity in the air in space 10 below the dew point temperature, the condensation of moisture in space 10 in particular, the condensation of moisture on the window glass is prevented.

The resetting of the moisture responsive device can be accomplished in various ways depending upon the furnace operation or the furnace temperature which is a measure of the heating load and a measure of outdoor temperature. One manner is shown in the embodiment of FIGURE 2 where the plenum temperature responsive bulb provides an output signal to reposition leg 55 and thus the control point of humidity responsive element 45.

In FIGURE 3 another embodiment is shown where the control point of the humidity control is modified by the variation in current in the electrical circuit of the heated wire 82 as the plenum temperature changes the resistance of element 84 in the electrical circuit.

While the present invention has been described in various manners, the intent is to limit the scope of the invention only by the appended claims in which—

I claim:

1. In a humidity control system for controlling the moisture level in a space to which heated air is supplied by a heating device and moisture is added to the air by a humidifier, space temperature responsive means adapted to control the heating device to vary the temperature of the air supplied to the space in response to the heating load of said space, moisture responsive means responsive to the moisture level in the air of said space adapted to control the humidifier to maintain said moisture level at a predetermined value, second temperature responsive means responsive to the temperature of the heated air supplied by the heating device, and means connecting said second temperature responsive means to reset a control point of said moisture responsive means to change said predetermined value to maintain the moisture level in the space below a value at which moisture will condense on windows in the space when a window temperature is below the dew point temperature of the air in the space.

2. In a humidity control system for controlling the moisture level in a space to which a heated medium is supplied by a heating device and moisture is added to air in the space by a humidification device, space temperature responsive means adapted to control the heating device to vary the temperature of the medium supplied to the space in response to the heating load of said space, moisture responsive means responsive to the moisture level in the air of said space adapted to control the humidifier to maintain said moisture level at a predetermined value, second temperature responsive means responsive to the temperature of the heated medium supplied by the heating device, and means connecting said second temperature responsive means to reset a control point of said moisture responsive means to change said predetermined value to maintain the moisture level in the space below a value at which moisture will condense on cold window glass in the space when an outdoor temperature is low enough to reduce the glass temperature below the dew point temperature of the air in the space.

3. In a moisture level control system for maintaining the moisture level of air in a space below the level at which moisture will condense on the windows when the outdoor temperature is low, temperature responsive means responsive to the temperature of the air in the space adapted to control an output of a heating device furnishing heat to the air of the space, moisture responsive means responsive to the moisture level of the air in the space adapted to control a device for adding moisture to the air of the space, first means responsive to a load indicative environmental condition established in the heating device as the heating load of the space changes with outdoor weather conditions, and means connecting said first means to said moisture responsive means to vary the level of moisture maintained in the space to prevent the condensation of moisture in the space.

4. In a moisture control system for maintaining the moisture of air in a space below a predetermined value at which moisture will condense on the windows when the outdoor temperature is low, control means responsive to a condition indicative of the need of heat in the space adapted to control an output of a space heating device, second control means responsive to a condition indicative of the moisture level of the air in the space adapted to control a device for supplying moisture to the air of the space, first means responsive to a load indicative condition established by operation of said heating device, and means connecting said first means to said second control means to vary the level of moisture maintained in the space to prevent moisture condensation.

5. In a system for resetting the control point of a humidity control to maintain the humidity level of a dwelling at a desired level for the particular outdoor weather conditions, temperature conditioning means for maintaining the temperature of a dwelling at a desired temperature, moisture control means for maintaining the level of humidity of the air in the dwelling at a predetermined value, and means responsive to a load indicative environment established by the operation of said temperature conditioning means for resetting said moisture control means to change said predetermined value as the temperature conditioning load of the dwelling changes.

6. In a control device adapted to control the humidity in air of a space at a level varying with the temperature conditioning load of the space, wherein the space is conditioned by a furnace whose temperature varies with the load, the combination comprising:

a base;

a first lever pivotally attached to said base, said first lever having first and second arms;

a second lever pivotally attached to said base, said second lever having first and second arms;

a moisture responsive element which changes in length as the moisture in the air surrounding said element changes;

connection means connecting said element between said first arms;

a switch having an operating button, said switch being adapted to control the supply of humidity to said space;

means mounting said switch so said second arm of said first lever engages said operating button;

an expansible member connected to a furnace temperature sensing bulb to form a filled system; and means mounting said expansible member between said base and said second arm of said second lever so the effect of said moisture responsive element on said switch can be varied with furnace temperature.

7. In a control device adapted to control the humidity in air of a space at a level varying with the temperature conditioning load of the space, wherein the space is conditioned by a furnace whose plenum temperature varies with the load, a base, a first lever pivotally attached to said base, said first lever having first and second arms, a second lever pivotally attached to said base, said second lever having first and second arms, a moisture responsive element which changes in length as the moisture in the air surrounding said element changes, connection means connecting said element between said first arms, a switch adapted to operate a humidifying device, means mounting said switch so said second arm of said first lever operates said switch, a bellows member connected to a remote furnace plenum temperature sensing bulb by a tube to form a fluid filled system, a heat sink encasing said bulb to cause said bulb to respond to the average furnace plenum temperature, and means mounting said member between said base and said second arm of said second lever so the effect of said moisture responsive element on said switch can be varied with plenum temperature.

8. In a control device for controlling the humidity in a space depending on the effects of outdoor temperature to prevent condensation of moisture in the space, a base, a U shaped bracket mounted at its closed end on said base, a humidity responsive element mounted between one leg of said bracket and said base to move said bracket as the length of said element changes with humidity, a switch adapted to control a space humidifier, connection means connecting another leg of said bracket to control said switch, a wire changing in length with temperature, means including said wire for connecting said legs to reposition the physical relation of said legs to change the effect of said element on said switch as said wire changes in length, a temperature responsive impedance element adapted to respond to the temperature of air in a furnace plenum, and electrical circuit means connecting said impedance element to said wire to change the level of heating current through said wire as said responsive element changes in temperature.

9. In a control system for controlling the humidity in a space affected by outdoor temperature to prevent condensation of moisture in the space, a furnace having a plenum, a base, a member mounted to said base, a humidity responsive element mounted between said member and said base, a switch adapted to control a space humidifier, connection means connecting said member to control said switch, a temperature responsive impedance element responsive to the temperature of air in said furnace plenum, means connecting said impedance element to said plenum, and electrical circuit means connecting an output of said impedance element to control a relation between said humidity responsive element and said switch.

10. In a control system,
cyclically operating temperature conditioning means,
a moisture responsive element,
a switch adapted to be connected in an electrical circuit for controlling moisture conditioning apparatus furnishing moisture to air in a space,
connection means connecting said element to control said switch,
further means responsive to a load indicative environmental condition established in the vicinity of said temperature conditioning means by the operation of said temperature conditioning means, and
means connecting said further means to adjust said moisture responsive element to change the effect of the said moisture responsive element on said switch.

11. A control apparatus adapted to be used in a system for maintaining the moisture level of a fluid in a space heated by variably loaded cycling heating means at a predetermined value which varies as a function of the heating load, the apparatus comprising:
control means adapted to control moisture supply means in response to a condition indicative of the moisture level of the fluid in the space;
condition responsive means adapted to reset the control means in response to a load indicative environmental condition established in the vicinity of the heating means by the operation of the heating means; and
means connecting the condition responsive means to the control means.

12. A control apparatus according to claim 11 wherein the condition responsive means comprises heated medium temperature responsive means adapted to respond to the temperature of a heated medium supplied by the heating means.

13. A control apparatus according to claim 11 wherein the heating means comprises a furnace having a plenum and the condition responsive means comprises a bellows member connected to a remote furnace plenum temperature sensing bulb by a tube to form a fluid filled system.

References Cited by the Examiner

UNITED STATES PATENTS

| | | | |
|---|---|---|---|
| 1,886,439 | 11/1932 | Wells | 236—68 |
| 2,166,799 | 7/1939 | Crago | 236—44 |
| 2,240,390 | 4/1941 | Chappell | 236—44 |
| 2,314,232 | 3/1943 | McLenegan | 236—44 |
| 2,354,773 | 8/1944 | Ray | 236—44 |
| 2,503,273 | 4/1950 | Johnson | 236—44 X |

ALDEN D. STEWART, *Primary Examiner.*